United States Patent
Ritonia et al.

(10) Patent No.: US 12,118,430 B1
(45) Date of Patent: *Oct. 15, 2024

(54) REAL-TIME COMPREHENSIVE QUICK RESPONSE ("QR") CODE TESTING FOR RELIABLE SCANNING

(71) Applicant: the dtx company, New York, NY (US)

(72) Inventors: Matthew Ritonia, Arlington, VA (US); Jacob M. Skinner, New York, NY (US)

(73) Assignee: The DTX Company, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,849

(22) Filed: May 21, 2024

Related U.S. Application Data

(63) Continuation of application No. 18/418,614, filed on Jan. 22, 2024, now Pat. No. 12,020,114.

(51) Int. Cl.
*G06K 7/14* (2006.01)

(52) U.S. Cl.
CPC .................... *G06K 7/1417* (2013.01)

(58) Field of Classification Search
CPC .. G06K 7/1404; G06K 7/1408; G06K 7/1413; G06K 7/1417
See application file for complete search history.

(56) References Cited

U.S. PATENT DOCUMENTS

| | | |
|---|---|---|
| 7,467,356 B2 | 12/2008 | Gettman et al. |
| 7,504,949 B1 | 3/2009 | Rouaix et al. |
| D697,529 S | 1/2014 | Judge Cornish |
| D702,723 S | 4/2014 | Abratowski et al. |
| D723,104 S | 2/2015 | Cho et al. |
| 9,201,975 B2 | 12/2015 | Hall |
| D769,296 S | 10/2016 | Grecia |
| 9,704,081 B2 | 7/2017 | Tanaka et al. |
| 9,936,249 B1 | 4/2018 | Nelson et al. |

(Continued)

FOREIGN PATENT DOCUMENTS

| | | |
|---|---|---|
| CN | 114528865 | 5/2022 |
| EP | 2302562 | 3/2011 |

OTHER PUBLICATIONS

Inderscience Enterprises Ltd., Wickramasinghe et al., "A Mathematical Model for Computational Aesthetics," pp. 310-324, 2010, Int. J. Computational Vision and Robotics, vol. 1, No. 3.

(Continued)

*Primary Examiner* — Laura A Gudorf
(74) *Attorney, Agent, or Firm* — Weiss & Arons LLP

(57) ABSTRACT

Apparatus and methods for testing a scannability of a QR code within multiple scenarios is provided. Methods may include generating the QR code and creating a background-scene for being applied to the QR code. Methods may include creating a composite image by combining the QR code with the background-scene. Methods may further include generating multiple versions of the composite image to mimic the composite image within the multiple scenarios. The multiple scenarios may include one or more environments the QR code may be positioned within. The multiple scenarios may include one or more perspectives the QR code may be scanned from. Methods may further include simulating scanning each of the multiple versions to determine a level of success of the scanning of each of the multiple versions.

20 Claims, 10 Drawing Sheets

(56) References Cited

U.S. PATENT DOCUMENTS

| | | |
|---|---|---|
| D826,955 S | 8/2018 | Grecia |
| D857,054 S | 8/2019 | Grecia |
| 10,375,060 B1 | 8/2019 | Graves et al. |
| D860,256 S | 9/2019 | Stephen |
| 10,460,138 B2 | 10/2019 | Barnum |
| 10,803,432 B1 | 10/2020 | Miles |
| D905,743 S | 12/2020 | Jewitt |
| 10,949,725 B1 | 3/2021 | Alvarez-Cohen et al. |
| 10,963,868 B1 | 3/2021 | McCauley et al. |
| D918,936 S | 5/2021 | Walsh et al. |
| 11,010,650 B1 | 5/2021 | Devlin et al. |
| 11,106,753 B1 | 8/2021 | Fowler et al. |
| 11,120,095 B2 | 9/2021 | Askarian et al. |
| D936,699 S | 11/2021 | McDonald |
| 11,182,768 B2 | 11/2021 | Fowler et al. |
| D939,570 S | 12/2021 | Dye et al. |
| 11,194,981 B2 | 12/2021 | Filter et al. |
| 11,205,105 B1 | 12/2021 | Devlin et al. |
| 11,206,432 B1 | 12/2021 | Fowler et al. |
| 11,263,282 B2 | 3/2022 | Fowler et al. |
| 11,334,779 B1 | 5/2022 | Schwarzberg |
| 11,347,823 B2 | 5/2022 | Askarian et al. |
| 11,379,820 B2 | 7/2022 | Mossoba et al. |
| 2002/0032791 A1 | 3/2002 | Isherwood et al. |
| 2002/0139839 A1 | 10/2002 | Catan |
| 2004/0123223 A1 | 6/2004 | Halford |
| 2004/0246529 A1 | 12/2004 | Pruden et al. |
| 2006/0196950 A1 | 9/2006 | Kiliccote |
| 2006/0215931 A1 | 9/2006 | Shimomukai |
| 2007/0035327 A1 | 2/2007 | Baeckler et al. |
| 2007/0286455 A1 | 12/2007 | Bradley |
| 2009/0094175 A1 | 4/2009 | Provos et al. |
| 2009/0240816 A1 | 9/2009 | Philyaw et al. |
| 2010/0128921 A1 | 5/2010 | Alattar et al. |
| 2011/0290882 A1 | 12/2011 | Gu et al. |
| 2012/0016678 A1 | 1/2012 | Gruber et al. |
| 2012/0206648 A1 | 8/2012 | Casagrande et al. |
| 2012/0256732 A1 | 10/2012 | McAllister |
| 2012/0278465 A1 | 11/2012 | Johnson |
| 2013/0112760 A1 | 5/2013 | Schory et al. |
| 2013/0144698 A1 | 6/2013 | De et al. |
| 2013/0197992 A1 | 8/2013 | Bao |
| 2013/0215475 A1 | 8/2013 | Noguchi |
| 2013/0228624 A1 | 9/2013 | Byrd et al. |
| 2013/0297430 A1 | 11/2013 | Soergel |
| 2014/0001253 A1 | 1/2014 | Smith |
| 2014/0095461 A1 | 4/2014 | Burt |
| 2014/0110468 A1 | 4/2014 | Kandregula |
| 2015/0006702 A1 | 1/2015 | Lakes et al. |
| 2015/0014417 A1 | 1/2015 | Finlow-Bates et al. |
| 2015/0048169 A1 | 2/2015 | Doberschutz |
| 2015/0099946 A1 | 4/2015 | Sahin |
| 2015/0262221 A1 | 9/2015 | Nakano et al. |
| 2015/0324678 A1 | 11/2015 | Simske et al. |
| 2015/0324946 A1 | 11/2015 | Arce et al. |
| 2016/0063129 A1 | 3/2016 | Lim et al. |
| 2016/0148083 A1 | 5/2016 | Osborne et al. |
| 2016/0162767 A1 | 6/2016 | Ito et al. |
| 2016/0189016 A1 | 6/2016 | Windmueller et al. |
| 2016/0247423 A1 | 8/2016 | Hohl et al. |
| 2016/0307084 A1 | 10/2016 | Cheung |
| 2016/0364825 A1 | 12/2016 | Pan |
| 2017/0264608 A1 | 9/2017 | Moore et al. |
| 2017/0300854 A1 | 10/2017 | Harcar et al. |
| 2018/0365330 A1 | 12/2018 | Lin et al. |
| 2019/0089757 A1 | 3/2019 | Sorensen et al. |
| 2019/0138721 A1 | 5/2019 | Wojnowicz et al. |
| 2019/0221293 A1 | 7/2019 | Zhang |
| 2019/0234975 A1 | 8/2019 | Pothini et al. |
| 2019/0258814 A1 | 8/2019 | Heeter |
| 2019/0281030 A1 | 9/2019 | Isaacson et al. |
| 2019/0281124 A1 | 9/2019 | Lim et al. |
| 2020/0356080 A1 | 11/2020 | Principato |
| 2020/0356083 A1 | 11/2020 | Principato |
| 2020/0356741 A1 | 11/2020 | Principato |
| 2020/0394699 A1 | 12/2020 | Mueller |
| 2021/0042730 A1 | 2/2021 | Lee |
| 2021/0056541 A1 | 2/2021 | Kim |
| 2021/0217006 A1 | 7/2021 | Ragavan et al. |
| 2021/0271803 A1 | 9/2021 | Seymour et al. |
| 2021/0287202 A1 | 9/2021 | Fowler et al. |
| 2021/0334490 A1 | 10/2021 | Luk et al. |
| 2021/0357715 A1 | 11/2021 | Schimke et al. |
| 2021/0377263 A1 | 12/2021 | Law |
| 2022/0215190 A1 | 7/2022 | Cohen et al. |
| 2022/0253811 A1 | 8/2022 | Fowler et al. |
| 2022/0374664 A1 | 11/2022 | Zhou et al. |

OTHER PUBLICATIONS

Elsevier, Maity et al., "A Computational Model to Predict Aesthetic Quality of Text Elements of GUI," pp. 152-159, 2016, Procedia Computer Science 84 (2016), www.sciencedirect.com.

AI Shack, Utkarsh Sinha, "Scanning QR Codes," 2010, https://aisback.in/tutorials/scanning-qr-codes-1/.

AIA Vision Online, "The Most Common Causes of Unreadable Barcodes," Apr. 15, 2015, https://www.visiononline.org/vision-resources-details.cfm?content_id=5404.

Workwithcolor.com, "Color Properties/Terminology," Retrieved on Jun. 8, 2020, http://www.workwithcolor.com/color-properties-definitions-0101.htm.

The Eurographics Association, Florian Hoenig, "Defining Computational Aesthetics," 2005, Computational Aesthetics in Graphics, Visualization and Imaging (2005), www.diglib.eg.org.

DataGenetics, "Wounded QR Codes," Nov. 2013, http:/datagenetics.com/blog/november12013/index.html.

QR Code Monkey, "6 Reasons Why Your QR Code Is Not Working," Retrieved on Jun. 9, 2020, https://www.qrcode-monkey.com/6-reasons-why-your-qr-code-is-not-working.

Techspot, Inc., Mark Turner, "QR Codes Explained," Sep. 3, 2018, https://www.techspot.com/guides/1676-qr-code-explained/.

Medium.com, Sciforce, "Computational Aesthetics: Shall We Let Computers Measure Beauty?," Jun. 12, 2020, https://medium.com/sciforce/computational-aesthetics-shall-we-let-computers-measure-beauty-db2205989fb.

Thonky.com, "Module Placement in Matrix," Retrieved on Jun. 8, 2020, https://www.thonky.com/qr-code-tutorial/module-placement-matrix.

Keyence Corporation of America, "What Is A Qr Code," Retrieved on Jun. 8, 2020, https://www.keyence.com/ss/products/auto_id/barcode_lecture/basic_2d/qr/.

Wikimedia Foundation, Inc., "QR Code," Retrieved on Jun. 3, 2020, https://en.wikipedia.org/wiki/QR_code.

Wikimedia Foundation, Inc., Walter Tuveli, "QR Code—Structure," 2012, https://en.wikipedia.org/wiki/QR_code#/media/File:QRCode-2-Structure.png.

Wikimedia Foundation, Inc., "ShotCode," Retrieved on Aug. 6, 2021, https://en.wikipedia.org/wiki/ShotCode#searchInput.

Medium.com, Punit Pathak, "ETL-Understanding It and Effectively Using It," Jan. 7, 2019, https://medium.com/hashmapinc/etl-understanding-it-and-effectively-using-it-f827a5b3e54d.

Strathmore University (Nairobi, Kenya), Kizi Dimira Othuon, "Improving Customer Experience Using an Android Barcode Reader Application," Apr. 2018, https://su-plus.strathmore.edu/bitstream/handle/11071/5978/Improving%20customer%20shopping%20experience%20using%20an%20Android%20barcode%20reader%20application.pdf?sequence=1 &isAllowed=y.

Westboroughtv.org, Horrigan, Aidan, "Mr. WHS 2020," Jun. 12, 2020, https://westboroughtv.org/mr-whs-2020-2/.

Facebook.com, Wa, Izakaya, "QR codes for the dinner menu and lunch menu at Memorial!" Jul. 24, 2020, https://m.facebook.com/196433773873837/posts/qr-codes-for-the-dinner-menu-and-lunch-menu-at-memorial,1730306280486571.

Ispot.tv, "StockX TV Spot, 'Flowcode: Never Sold Out,'" Mar. 27, 2020, https://www.ispot.tv/ad/nVly/stockx-flowcode-never-sold-out.

(56) References Cited

OTHER PUBLICATIONS

Nyp.org, "#FitForTheFrontline Challenge Unites Nation's Top Medical Centers to Support Frontline Healthcare Workers," May 28, 2020, https://www.nvp.org/news/fit-for-the-frontline-challenge.
"Anthony Fu's QR ToolKit," https://qrcode.antfu.me/#verify, Retrieved on Oct. 19, 2023.

701

```
{
    "passes": true,
    "scores": {
        "overall": 0.83,
        "environment": {
            "indoor": 0.9,
            "megatron": 0.9,
            "outdoor": 0.7,
        },
        "perspective": {
            "bottom": 1.0,
            "centered": 0.83,
            "left": 1.0,
            "right": 0.67,
            "top": 0.67
        }
    }
}
```

FIG. 7

```
GET   Healthcheck
POST  Generate Code Configs
POST  Generate Page Config
GET   Healthcheck
POST  Scan Parameters
No Parameters Request body required                              multipart/form-data file* required     Choose File   No file chosen
string ($binary)

Cancel   Reset

Execute
```

FIG. 8

REAL-TIME COMPREHENSIVE QUICK RESPONSE ("QR") CODE TESTING FOR RELIABLE SCANNING

CROSS REFERENCE TO RELATED APPLICATION

This application is a continuation of U.S. patent application Ser. No. 18/418,614 filed on Jan. 22, 2024, and entitled "REAL-TIME COMPREHENSIVE QR CODE TESTING FOR RELIABLE SCANNING" which is hereby incorporated by reference herein in its entirety.

COMPUTER PROGRAM LISTING APPENDIX

This application includes a computer program listing as an appendix. The appendix includes one (1) ASCII text file (submitted via EFS-Web). The appendix is hereby incorporated by reference herein in its entirety. The table below lists the ASCII text file included in the appendix:

| File No. | File Name | Date Created | File Size (kilobytes) |
|---|---|---|---|
| 1 | QR_Scan_def.txt | Aug. 29, 2023 | 9 kb |

The computer program listing included in the appendix provides source code for implementing a QR code testing tool in accordance with principles of the disclosure.

FIELD OF TECHNOLOGY

Aspects of the disclosure relate to technology for generating machine-readable optical labels such as quick-response ("QR") codes for testing scannability.

BACKGROUND

QR codes provide businesses with a fast and efficient medium for connecting with consumers. Instructions, such as URLs contact information and other alphanumeric information may be encoded in QR codes. Businesses may leverage QR codes to guide consumers to a desired destination (real or virtual) where the customers can access products or services provided by the business. However, a scanning device is needed to scan and interpret the instructions encoded in a QR code.

In 2010, 62.6 million people in the United States used smartphones. In 2020 that number is predicted to more than quadruple to 272.6 million. Commensurate with increased smartphone use is integration of technology into smartphones that scans and interprets QR codes. Today, many smartphones include a native camera application that can recognize QR codes. There is no need to download and install a separate QR reader application or use the separate QR reader to scan a QR code.

QR codes now potentially offer an inexpensive means of providing many consumers with easy access to products or services. Consumers are already using their smartphones to search for more information about a product/service of interest. Now, businesses can tap into this tendency by using QR codes to guide consumers to targeted content associated with a product/service. Furthermore, QR codes are inexpensive and easy to print on a variety of surfaces such as business cards, product packaging, posters or marketing materials.

However, one hurdle still facing widespread adoption of QR codes is that the instructions encoded in a QR code must follow regimented protocols. The regimented protocols ensure that encoded instructions can be successfully scanned and interpreted by a smartphone. Altering the regimented protocols to generate a QR code that includes aesthetic designs may interfere with the ability of a smartphone to reliably scan and interpret the encoded instructions.

Prior to going to production with a QR code, it is desirable to ensure that the QR code will scan reliably on user's smartphones. As QR codes are typically overlaid on a company's website, billboards, products, fliers, etc., ensuring that a QR code will be scannable is imperative to avoid a potentially significant loss of time and resources.

Therefore, it would be desirable to leverage real-time, comprehensive code testing for reliable scanning of QR codes that include aesthetic designs. It would further be desirable to provide a platform for real-time feedback of the level of success of the testing and corrective protocols for implementation.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 7 shows an illustrative diagram in accordance with principles of the disclosure.

FIG. 8 shows an illustrative user interface in accordance with principles of the disclosure.

DETAILED DESCRIPTION OF THE DISCLOSURE

Figure 1:
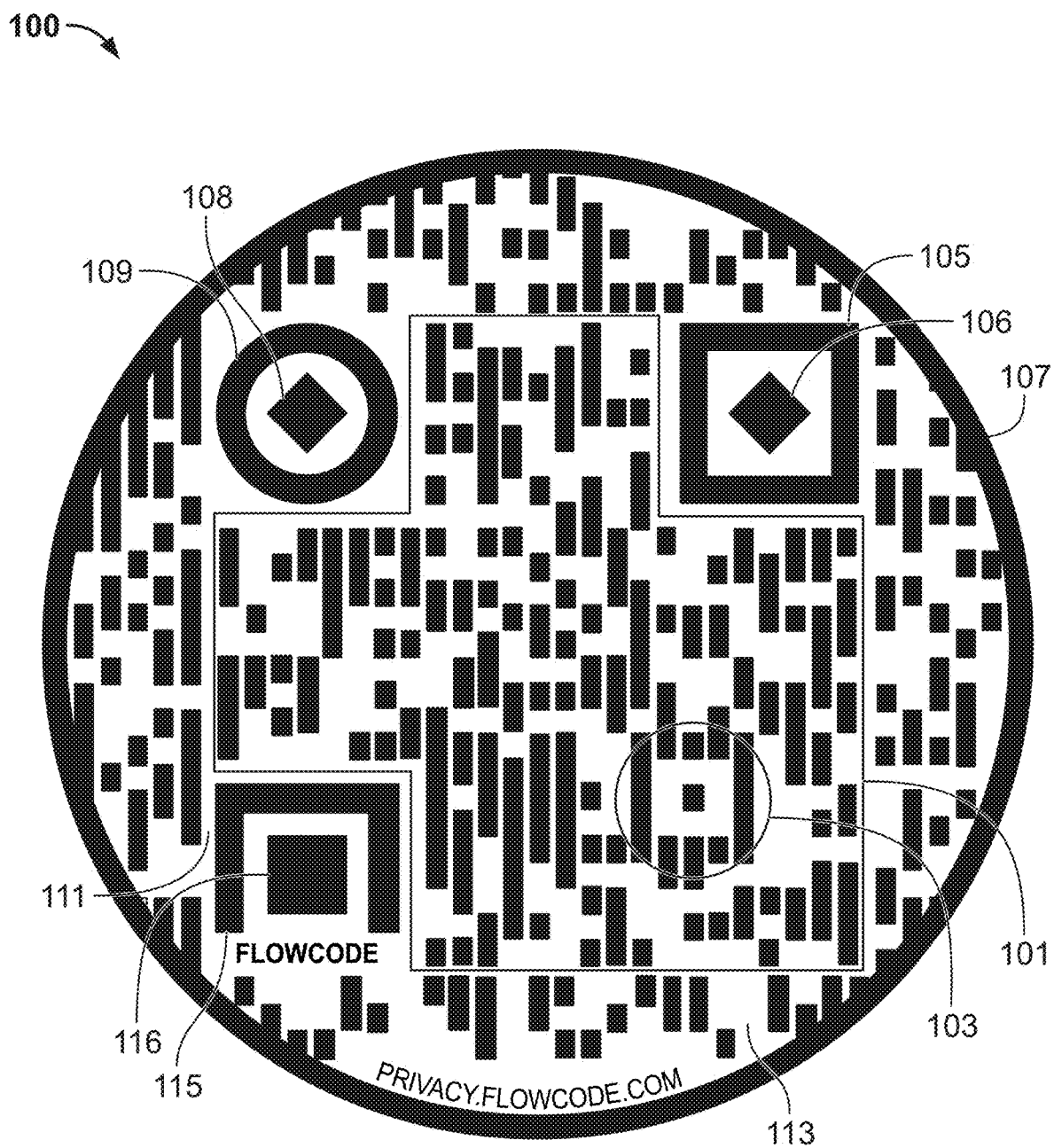
FIG. 1 shows an illustrative apparatus in accordance with principles of the disclosure.

A method for testing success of scannability of a quick-response ("QR") code is provided. The method may include simulating different scenarios that may be associated with the QR code. The scenarios may be implemented for testing the QR code.

In some embodiments, the testing may be used to obtain a scannability index value for the QR code. The scannability index value may indicate a level of success of scannability of the QR code.

For the purposes of the disclosure, a QR code may be scannable when the instructions embedded in the QR code can be successfully downloaded by a scanning device.

The method may include generating the QR code. The QR code may include a data zone and an environmental zone. The data zone may include machine readable instructions that, when scanned, trigger an action on a device used to scan the QR code. The environmental zone may include a buffer of light modules that surround a data zone and associated position detection patterns and may enable a scanning device to distinguish the data zone from its surrounding environment zone.

The method may include simulating a scanning of the QR code. The simulating may be for testing the scannability of the QR code itself. The simulating of the scanning of the QR code may be a first scoring of scannability of the QR code. The first scoring may score the QR code as a stand-alone QR code. A second scoring, described below, may score the scannability of the QR code after the QR code is combined with a background-scene as a composite image.

It should be appreciated that the first scoring may be a binary scoring. The first scoring method may perform a critical check for assuring whether the code will scan or not. The first scoring method may return the results as 'true' or 'false.'

The method may further include generating a result of the simulating. When the results of the first scoring return a 'false' result, this may correspond to a negative indication of scannability of the QR code. The method may include re-engineering the QR code to overcome the negative indication of scannability.

When a positive indication of scannability of the QR code is obtained, the method may include creating a background-scene for being applied to the QR code. The background-scene may include one or more images, designs, logos or any other suitable scene.

The background-scene may be user-configurable. The background-scene may be uploaded from a third-party designer.

The method may further include combining the QR code with the background-scene thereby creating a composite image.

In some embodiments, the combining may include superimposing the QR code to the background-scene. In some embodiments, the combining may include positioning the background-scene behind the QR code. In some embodiments, the combining may include overlaying the background-scene with the QR code or blended in with the QR code.

The method may include, following the creating of the composite image, generating multiple versions of the composite image to mimic the composite image within a plurality of scenarios.

When a QR code is generated and prepared for production, the QR code may be placed on a product being sold in a store, on an advertisement posted on an outdoor wall, on a small or oversized electronic screen, on a billboard being viewed from a distance, or on any other suitable medium.

In any of these scenarios the QR code may be scanned from multiple positions. A user, or the scanning device, may be directly facing the QR code. The user or scanning device may be positioned at a left, right, top or bottom point-of-view of the QR code, or any other suitable position.

Because of the possible environments on which the QR code may be posted, and because of the positions in which the user and/or scanning device may be positioned when scanning, the potential for experiencing a scanning error may increase.

The method may include simulating each of the potential environments in which the QR code may be placed prior to production and further testing the success of scannability of the QR code within each of the simulated environments.

The environments may include, but may not be limited to, an indoor environment, an outdoor environment, a billboard environment and/or an oversized electronic screen environment. The billboard environment may include an electronic advertisement displayed on a street corner. The billboard environment may include an electronic screen displayed at a stadium facing all the spectators.

An exemplary QR code in an indoor environment may include a QR code placed on packaging of a product sold in a store. Such a QR code may be in an indoor room with indoor lighting and brightness.

An exemplary QR code in an outdoor environment may include a QR code placed on an advertisement on an outdoor wall of a building. Such a QR code may be in a position where the lighting may differ from a QR code that is indoors. Additionally, the lighting may differ based on the weather conditions.

An exemplary QR code in a billboard environment may include a QR code placed on an enlarged screen projected at a stadium facing a large audience. The lighting of a QR code on an enlarged screen and scanned from a great distance may differ from a more typical outdoor environment.

For each of the environments, the method may include adjusting a brightness of the composite image in order to simulate such environments. The adjusting of the brightness may include adjusting both the brightness of colors of the QR code and of the background-scene collectively.

The adjusting of the brightness may include adjusting a selection of colors and adjusting a contrast of the colors of the composite image in order to get an effect of an indoor/outdoor scene.

In some embodiments, photographic environment images may be used as templates for the testing of the composite images within each of the environments. These photographic environment images may be pictures taken of a real QR code within each of the environments. There may be a template for each environment. The composite image being tested may then be superimposed in place of the existing QR code in the template.

In some embodiments, AI and ML may be used to extract data and details from the real-life environment images. The data and details may then be used to create and generate synthetic templates that may mimic these photographic environment images to a near-perfect match.

In response to the adjusting, the method may include outputting a plurality of environmental composite images. The plurality of environmental composite images may be stored, at least temporarily, for testing the success of the scanning of each of the plurality of environmental composite images.

The plurality of environmental composite images may include an indoor environment composite image, an outdoor environment composite image and/or an oversized electronic screen environment composite image.

The method may also include simulating each of the perspectives from which the QR code may be scanned prior to production and further testing the success of scannability of each of the simulated perspectives.

The perspectives of a QR code may include a top-view perspective, a bottom-view perspective, a left-view perspective and a right-view perspective. The perspective may also include a centered perspective. The centered perspective may be indicative of a user location in front of the QR code. The centered perspective may be indicative of a user directly facing the QR code.

An exemplary top-view perspective of a QR code may be when the user or scanning device is at a distance higher than or on top of the QR code.

An exemplary bottom-view perspective of a QR code may be when the user or scanning device is in a position lower than the QR code.

An exemplary left-view perspective of a QR code may be when the user or scanning device is positioned to the left of the QR code and not directly in front of the QR code.

An exemplary right-view perspective of a QR code may be when the user or scanning device is positioned to the right of the QR code and not directly in front of the QR code.

For each of the perspectives, the method may include repositioning the composite image into multiple positions to mimic the plurality of perspectives. The repositioning may include repositioning both the QR code and the background-scene collectively.

The repositioning may include identifying four key coordinates of the composite image. For each of the plurality of perspectives, the method may include running a coefficient algorithm on each of the four key coordinates using a pre-defined coefficient. In response to the running, outputting each of the plurality of perspectives.

In some embodiments following the identifying of the four key coordinates, the method may include transforming the composite image into a three-dimensional ("3D") composite image. The transforming may be performed using the four key coordinates. The transforming may include using a first, second, third and fourth key coordinate to transform the image into the 3D composite image. The transformation may be performed using the method of UV mapping. UV mapping is a 3D modeling process that can project a 3D model's surface to a two-dimensional ("2D") image which can enable texture mapping.

For example, in order to mimic the experience of scanning a QR code from a stadium screen, the composite image may need to be converted to a 3D image. Following the conversion, the coordinates of the 3D image may be adjusted to reposition the 3D image from different points of view.

In response to the repositioning, the method may include outputting a plurality of perspective composite images. The plurality of perspective composite images may include a plurality of perspective indoor environment composite images, a plurality of perspective outdoor environment composite images and/or a plurality of perspective oversized electronic screen environment composite images.

The method may further include storing, at least temporarily, the plurality of perspective composite images.

Following the generating of the multiple versions of the composite image, the method may include predicting a success of scannability of the composite image.

The method may include simulating a scan of each of the plurality of environmental composite images. The simulating of the scanning of each of the plurality of environmental composite images may be a second scoring of the QR code. The second scoring may include scoring the scannability of the QR code in combination with the background scene within each perspective of each environment.

The method may also include simulating a scan of each of the plurality of perspective composite images. In some embodiments, the simulating of the scan may be performed using off the shelf models to decode the QR code patterns.

In response to the scanning the method may include determining a set of scannability results for each of the plurality of perspectives. The set of scannability results may include a scannability result for each perspective within each of the plurality of environmental composite images.

The method may include applying an aggregation function that can sum, or otherwise calculate a value corresponding to, all "successful scans" across all perspectives within each environment based on the scannability result. The sum may be then divided by the amount of perspectives being tested.

In some embodiments, the second scoring method may include scoring each of the plurality of perspective composite images based on a scannability index.

In response to the scoring the method may include weighing each of the pluralities of scores against a pre-determined scannability index value.

Based on the weighing, the method may include determining a level of success for each of the plurality of environmental composite images and for each of the plurality of perspective composite images.

The method may further include determining an overall average of the scannability of the composite image based on each of the pluralities of the scores.

When the overall average is greater than a pre-determined percentage, the method may include transmitting the composite image for production.

When the overall average is less than the pre-determined percentage, the method may include triggering one or more corrective protocols to increase the scannability index.

The corrective protocols may include adjusting the contrast and/or distance between two colors of the composite image.

It should be appreciated that in some embodiments, the greater the contrast between the colors, the greater the success of the scanning. Additionally, the greater the distance between the two colors, in some embodiments, the greater the success of scanning as well.

Examples of improvements set forth herein include increasing the logo dimensions to maximize the logo's space vis-à-vis the QR code, creating a dark and light color categorization on the color brightness value to handle unique colors, limiting the level of brightness to enforce 5:4 contrast ratios for background elements, searching to find a preferably minimum number of logos with dark colors, and building logo selection logic.

With respect to the 5:4 contrast, or other suitable contrast, the colors in the generated QR code preferably pull two colors and put the darker color in the foreground and the lighter color in the background. In preferred embodiments, the platform may preferably utilize only red colors, blue colors and black colors to increase scannability. In addition, the platform may preferably eliminate near-white colors and/or white colors from the generated code.

When any of the corrective protocols are performed, the method may include rescanning the composite image and further verifying the scannability index.

In response to the triggering of the one or more corrective protocols, the method may include repeating the performing of the testing on the composite image following the adjusting of the one or more configurations.

In some embodiments, the method may include limiting the mimicking of the composite image. The composite image may be mimicked to simulate a pre-selected plurality of scenarios. For example, when a QR code is generated for an entity that may be placing the QR code only on products that may be sold in indoor environments, it may not be necessary to test the success of the scanning in all probable scenarios.

The method may enable the testing scenarios to be user configurable. The method may include receiving a selection of one or more testing scenarios from the plurality of scenarios to be tested.

The method may further include adjusting the composite image based on the selected one or more testing scenarios.

The method may further include performing the aforementioned steps to test the success of scannability of the composite image within the selected one or more testing scenarios.

It should also be appreciated that the composite image may be stored for future use. The QR code may not be tested at a first time for each and every probable scenario. However the QR code may be prepared in the future for production for use within an additional environment and may be retrieved from storage for further testing.

It should be appreciated that a machine learning predictive model may be generated for analyzing QR codes and recommending changes to the QR codes. The machine learning predictive model may be trained by feeding the model a plurality of data sets. Each data set may include the composite image where the overall average score is less than the pre-determined percentage and also include an updated composite image that was generated to correct the 'failed' composite image. The machine learning predictive model may be used at the time the QR code and background-scene are generated to at least mitigate the chance of an unsuccessful scanning of the composite image.

It should be appreciated that the methods described herein may also be performed on other machine-readable optical labels. Other illustrative machine-readable optical labels may include a linear barcode or a two-dimensional matrix barcode such as Aztec code, ShotCode, SPARQCode, and the like.

A method for simulating and aggregating different testing scenarios is provided. The method may utilize a computer processor and one or more non-transitory computer-readable media storing computer executable instructions. The instructions when executed by the computer processor may test a QR code to obtain a scannability index value for the QR code.

The method may include executing a QR code generator to generate the QR code. The QR code generator may be a software application. The QR code generator may be executed by the processor. The QR code generator may generate the QR code. The QR code may include a data zone and an environmental zone.

The QR code generator may be further configured to create a background-scene for being applied to the QR code. The QR code generator may create the background-scene based on pre-defined protocols, user-input and/or data received from a third-party.

The QR code generator may be configured to layer the QR code on top of the background-scene thereby creating a composite image. The QR code generator may be further configured to store the composite image in a data repository within memory.

The method may further include using a QR code replicator for generating multiple versions of the composite image. The QR code replicator may be a software application. The multiple versions may enable mimicking the composite image within a plurality of scenarios. The QR code replicator may be an application executed by the processor.

The QR code replicator may be configured to, upon execution, retrieve the composite image from memory. The QR code replicator may be configured to adjust a brightness of colors of the composite image to mimic the composite image in each of a plurality of environments. The adjusting may include adjusting both the brightness of colors of the QR code and the brightness of colors of the background-scene.

The QR code replicator may be further configured to, in response to the adjusting, output a plurality of environmental composite images. The QR code replicator may be further configured to store the plurality of environmental composite images in memory.

The QR code replicator may also be configured to mimic a plurality of perspectives the QR code may be positioned in by repositioning the coordinates of the composite image into multiple positions. The repositioning may include repositioning both the QR code and the background-scene.

In response to the repositioning, the QR code replicator may be configured to output a plurality of perspective composite images and store the plurality of perspective composite images in memory.

The method may further include using a QR code scan predictor for predicting a success of scannability of the composite image. The QR code scan predictor may be a software application. The QR code scan predictor may be an application executed by the processor. The QR code scan predictor may be configured to simulate a scan of each of the plurality of environmental composite images.

The QR code scan predictor may be configured to simulate a scan of each of the plurality of perspective composite images.

Following the simulating of the scanning, the QR code scan predictor may be configured to determine a result of each of the simulated scans by scoring each of the plurality of environmental composite images based on a scannability index. The scoring may include scoring each of the plurality of perspective composite images based on the scannability index.

The QR code scan predictor may be further configured to weigh each of the pluralities of scores against a pre-determined scannability index value. Based on the weighing, the QR code scan predictor may be configured to determine a level of success for each of the plurality of environmental composite images and for each of the plurality of perspective composite images.

The QR code scan predictor may also be configured to determine an overall average of the scannability of the composite image based on each of the pluralities of the scores.

When the overall average is greater than a pre-determined percentage, the QR code scan predictor may be configured to transmit the composite image for production. When the overall average is less than the pre-determined percentage, the QR code scan predictor may be configured to trigger one or more corrective protocols to increase the scannability index.

Following the triggering of one or more corrective protocols to adjust the composite image, the QR code scan predictor may be configured to repeat the performing of the testing on the composite image following the adjusting of the one or more configurations.

A QR code for the purposes of the disclosure may include a plurality of modules. A module may be a dark module or a light module. A scanning device, such as a smartphone, may be configured to interpret instructions encoded by a pattern of light and dark modules. For example, the scanning device may interpret the pattern of modules as a binary encoded message. A light module may represent a 0, and a dark module may represent a 1.

A pattern of modules within a QR code may define a data zone, position detection patterns, timing patterns, an error correction level and error correction code. The data zone may include machine readable instructions that, when scanned, trigger an action on a device used to scan the QR code. For example, the QR code may include instructions for launching a webpage or text message application. The instructions encoded in the data zone may prefill a destination field of the text message or insert text into the body of a message. The instructions encoded in the data zone may trigger a display of information on the scanning device such as a product identifier or instructions on how to use the product. The more information included within the data zone, the more modules a QR code will have to encode that information.

Position detection patterns may provide instructions that orient a scanning device to identify and read the data zone. Position detection patterns may include position markers. For example, a QR code may include three position markers ("eyes") at a top left, top right, and bottom left of the QR code. Position markers may be defined based on a pattern of light/dark modules. For example, a position marker may be spaced apart from the data zone by a border of light modules. The position marker may include an outer border of dark modules. The outer border may surround an inner border of light modules. The inner border of light modules may surround a core of dark modules. A position mark may be designed to include a pattern of modules that is unlikely to appear elsewhere within the QR code.

Each position marker may be linked to another position marker by a timing pattern. An illustrative timing pattern may include a horizontal line of alternating light/dark modules. An illustrative timing pattern may include a vertical line of alternating light/dark modules. Each line of alternating light/dark modules may start and end with a dark module.

The position detection pattern may include an alignment pattern. An alignment pattern may overlap a timing pattern. The alignment pattern may include one or more alignment markers. An illustrative alignment marker may include an outer border of dark modules surrounding an inner border of light modules and a single dark module in the center of the marker.

The alignment pattern may allow a scanning device to determine an orientation of the QR code. The alignment pattern may improve scanning speed of the QR code. The alignment pattern may include markers or a pattern that allows a scanning device to orient the QR code despite displacement of modules due to distortion. For example, the alignment pattern may allow a device to scan QR codes applied to a curved surface. Generally, a larger QR code will include more alignment patterns than a smaller QR code. Size of a QR code may be defined based on a number of modules included in the QR code.

The QR code may include error correction code. The error correction code may be included in the data zone. An illustrative error correction code may include Reed-Solomon codes. The error correction code may be applied to restore data encoded by modules when a segment of a QR code is missing or damaged. A QR code may include various levels of error correction.

Modules used for error correction store redundant copies of data that compensate for damaged modules that cannot be read by a scanner. An exemplary target error correction level may allow restoration of at least 15% of data bytes. The target error correction level is determined based on Reed-Solomon codes included in the QR code. Other illustrative target error correction levels may include:

Level L—7% of data bytes can be restored.
Level M—15% of data bytes can be restored.
Level Q—25% of data bytes can be restored.
Level H—30% of data bytes can be restored.

A QR code that includes a 30% error correction level will be scannable by a device even if 30% of the modules are damaged (soiled, washed out, faded, replaced with images). Generally, the higher level of error correction included in the QR code, the less instructions can be stored within a data zone of the QR code.

The system may include a software engine. The software engine may include software tools that enable a user to design the QR code, retrieve QR code data and/or design from a third party or any other suitable method. The software engine may generate the QR code such that the QR code is reliably scannable by a scanning device.

A QR code may include an environmental zone. The environmental zone may include a buffer of light modules that surround a data zone and associated position detection patterns. The buffer may allow a scanning device to distinguish the data zone from its surrounding environment zone. An illustrative buffer may be four light modules wide.

A software engine may generate an environmental zone for the QR code. The software engine may generate the buffer surrounding the data zone and position detection patterns. The software engine may generate modules for an environmental zone surrounding the data zone. The environmental zone of a QR code may include marks or designs that are not intended to be interpreted by a scanning device. The environmental zone may provide a QR code an aesthetic appearance that is different from a standardized appearance of a QR code. A standardized appearance of a QR code may be defined by one or more standards published by the International Organization for Standardization (ISO) of Geneva, Switzerland. Illustrative standards published by the ISO include ISO/IEC 18004:2015 and ISO/IEC 24778:2008 which are hereby incorporated herein by reference in their respective entireties.

The software engine may generate a data zone for the QR code. The software engine may generate the data zone based on design choices entered by a user. Exemplary design choices that may be presented by the software engine may include shapes, colors, color gradients and shading of one or more modules of the data zone. The software engine may generate a QR code based on the user's design choices such that the QR code has a scan recognition speed of 3 seconds or less. The software engine may dynamically adjust formulation of the environmental zone based on design choices associated with the data zone. The software engine may dynamically generate the data zone based on design choices associated with the environmental zone.

In response to detecting user entered design choices, the software engine may dynamically change the design choices applied to modules in the data zone to improve readability of the data zone. Illustrative changes may include alterations to size, shape, color of a module and position of a module relative to other modules. The software engine may change the user entered design choices applied to modules in the data zone such that, even after applying the altered design choices, the generated QR code maintains a desired appearance associated with the user entered design choices. Exemplary changes may include changing one or more of the following design choices applied to modules within the data zone: color, contrast, skew, blur, sharpness, hue, tint, brightness, shade, shape, gradient, tone, and saturation.

Changes to modules within a data zone may include redistributing two or more design choices applied to modules within the data zone. For example, the software engine may generate a data zone that adheres to colors or a color gradient entered by a user, but may redistribute the colors as applied to individual modules within the data zone. Such a redistribution may improve readability of the data zone by a scanning device.

Changes applied to modules within the data zone may include revising a mask pattern applied to a generated QR code. A mask pattern may rearrange modules in the data zone that may confuse a scanner. For example, applying a mask pattern may ensure that a generated QR code does not include a threshold number of adjacent modules having the same color. Masking may eliminate module patterns that may be erroneously interpreted by a scanner as a location, position or timing marker.

In some embodiments, the software engine may suggest a combination of design choices for the environmental and data zones based on a user's entered design choices. The combination of design choices suggested by the software engine may generate a QR code that has a threshold level of readability and error correction. The software engine may be configured to show an illustrative QR code that minimizes the number of changes to the user's design choices and generates a QR code having the threshold level of readability and error correction.

The software engine may be configured to minimize the number of changes to the user's design choices such that an appearance of the generated QR code is within a threshold range of the user's design choices. The software engine may apply machine learning techniques, such as fuzzy logic, to define an "appearance" based on user entered design choices.

The software engine may limit design choices available to a user. For example, the software engine may limit the user to design choices that allow generation of a QR code having a target scan error correction level. The software engine may dynamically determine design choices available to the user based on previously entered design choices. The software engine may determine design choices available to the user after receiving two or more user entered design choices.

Exemplary design choices that may be presented by the software engine may include shapes, colors, color gradients and shading of one or more modules of the QR code. For example, a design choice may include a shape or color of modules that define a position or timing marker of the QR code. A marker may include a plurality of modules arranged in specific positions with respect to each other.

Exemplary design choices that may be provided by the software engine to a user include shapes, colors, color gradients and shading of one or more modules within a QR code. Exemplary design choices that may be provided by the software engine to a user include shapes, colors, color gradients and shading of modules patterns within a QR code. Exemplary patterns may include a position pattern, an alignment pattern and a timing pattern. A pattern may include two or more markers positioned in a desired arrangement. A pattern may be included within a data zone, environmental zone or any other part of the QR code.

The software engine may allow the user to enter design choices that will be applied to a data zone of the QR code. A data zone may include modules that are arranged to encode computer executable instructions. When the QR code is scanned, the executable instructions may configure the scanning device to perform a target function. For example, the executable instructions may launch a web browser resident on the scanning device and load a target landing page. The executable instructions may trigger any suitable function of the scanning device. Other illustrative functions may include launching an email/text application on the scanning device or generating a pre-formatted message.

The data zone may include modules defining version and format information of the QR code. The data zone may include modules defining error correction codes. The data zone may include modules defining timing, position and alignment patterns.

The software engine may allow the user to enter design choices that will be applied to an environmental zone of the QR code. Illustrative design choices may include shapes, colors, color gradients and shading of modules or other marks included in the environmental zone.

The software engine may generate a QR code that includes the design choices entered by the user. The software engine may generate a QR code that includes the design choices entered by the user, constrained by an outer perimeter. An environmental zone may include all modules or marks positioned between a data zone and the outer perimeter. The environmental zone may include the outer perimeter. The software engine may be configured to produce a QR code having an outer perimeter having any suitable shape, such as circular, triangular, rectangular or trapezoidal outer perimeters. The software engine may generate fill for the environmental zone between the data zone and the perimeter.

The software engine may be configured to generate fill for the QR code. The fill may be a color or other design choice applied to light modules within the QR code. The software engine may generate fill that does not negatively impact a target scan speed or error correction level of the data zone.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method and/or apparatus.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1 shows illustrative machine-readable optical label 100. Label 100 may be generated using apparatus and methods described therein. Label 100 includes data zone 101. Data zone 101 includes light and dark modules that encode executable instructions. Label 100 includes alignment marker 103. Alignment marker 103 is defined by an outer border that includes light and dark modules, an inner border of light modules and a dark module in the center.

Label 100 also includes position markers 105, 109 and 115. Position marker 105 is in a top-right corner of data zone 101. Position marker 105 includes an outer square-shaped border of dark modules and an inner border of light modules surrounding diamond-shaped core 106 of dark modules.

Position marker 109 is in a top-left corner of data zone 101. Position marker 109 includes an outer circular-shaped border of dark modules and an inner border of light modules surrounding diamond-shaped core 108 of dark modules.

Position marker 115 is in a bottom-left corner of data zone 101. Position marker 115 includes an outer shaped border that includes three lines of dark modules. Position marker 115 includes a FLOWCODE logo as part of the outer border. Position marker 115 includes an inner border of light modules surrounding square-shaped core 116 of dark modules.

Label 100 includes environmental zone 113. Environmental zone 113 includes modules that are not interpreted when label 100 is scanned. Environmental zone 113 may include all parts of label 100 outside of data zone 101. Environmental zone 113 has been constructed such that it has an appearance that, to a human eye, seems contiguous with data zone 101. Environmental zone 113 may be constructed such that it does not interfere with the scanning of data zone 101. For example, apparatus and methods described herein may adjust an arrangement of modules within environmental zone 113 to ensure that the modules of environmental zone 113 do not interfere with a scanning of data zone 101.

Environmental zone 113 includes buffer 111. Buffer 111 are light modules that space data zone 101 apart from modules of environmental zone 113. Apparatus and methods described herein may adjust a width of buffer 111 to ensure that environmental zone 113 does not interfere with a scanning of data zone 101. Apparatus and methods described herein may adjust a width of buffer 111 to ensure that environmental zone 113 does not interfere with a scanning of data zone 101 and environmental zone 113 has an appearance that, to a human eye, seems contiguous with data zone 101.

Label 100 includes circular perimeter 107. Perimeter 107 may be included in environmental zone 113. Apparatus and methods described herein may adjust a line thickness, shape, color or any other suitable design choice of perimeter 107. Apparatus and methods described herein may ensure that perimeter 107 does not interfere with a scanning of data zone 101. Apparatus and methods described herein may arrange modules of environmental zone 113 within a space between data zone 101 and perimeter 107.

Figure 2:
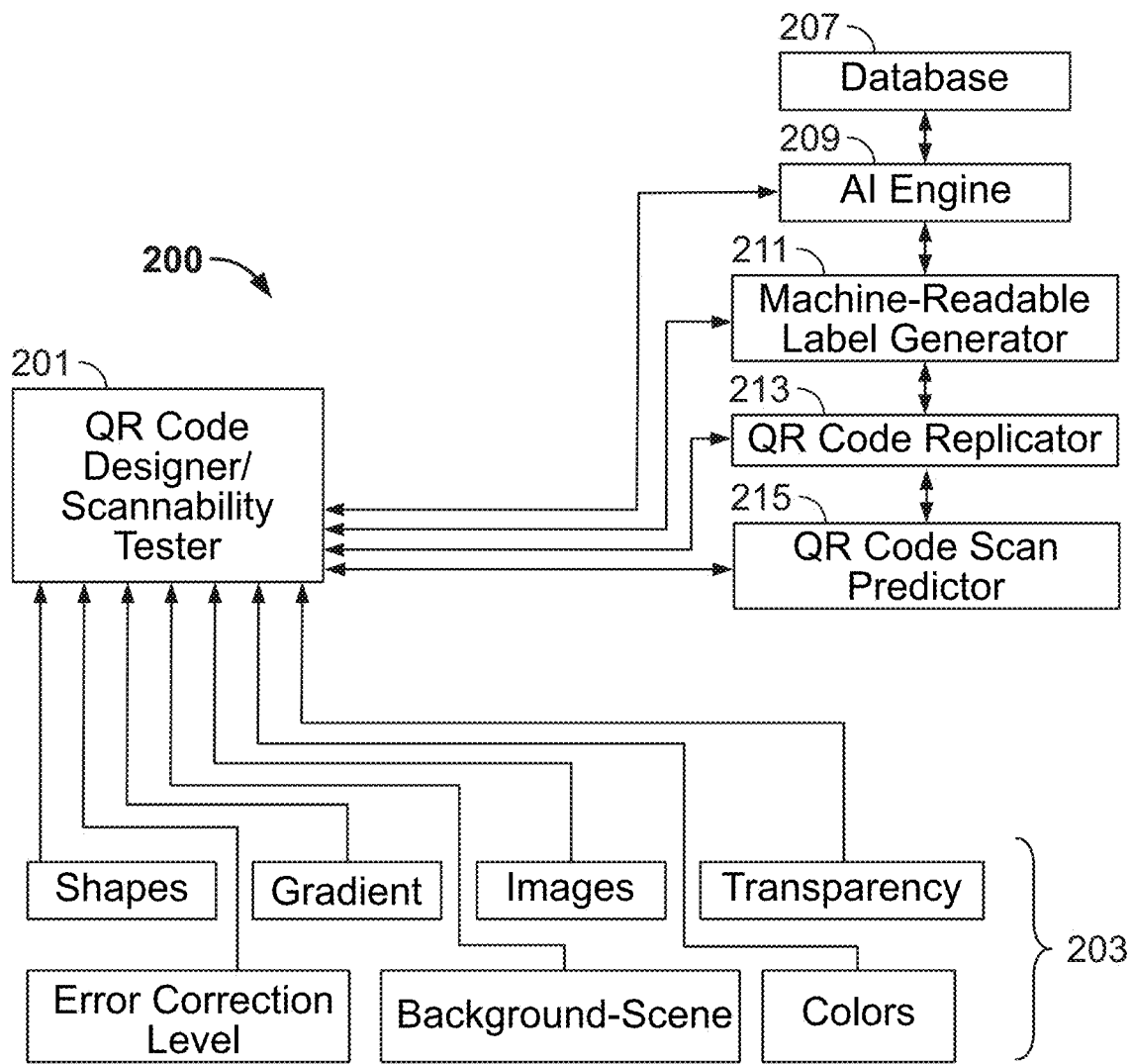
FIG. 2 shows an illustrative apparatus in accordance with principles of the disclosure.

FIG. 2 shows illustrative system 200. System 200 includes components 201, 203, 207, 209, 211, 213 and 215. Components of system 200 may include a processor circuit. The processor circuit may control overall operation of system 200 or one or more of components 201, 203, 207, 209, 211, 213 and 215. The processor circuit may include hardware, such as one or more integrated circuits that form a chipset. The hardware may include digital or analog logic circuitry 202 configured to perform any suitable (e.g., logical) operation.

Each component may include input/output ("I/O") circuitry, which may include a transmitter device and a receiver device and may interface with fiber optic cable, coaxial cable, telephone lines, wireless devices, physical network layer hardware, a keypad/display control device or any other suitable encoded media or devices. Each component may include peripheral devices, which may include counter timers, real-time timers, power-on reset generators or any other suitable peripheral devices.

Each component may include a machine-readable memory. Machine-readable memory may be configured to store, in machine-readable data structures, instructions for: triggering a target action when label 100 is scanned, formulating an arrangement of dark/light modules, translating URL-derived design choices into an arrangement of dark/light modules, testing scannability of label 100 or any other suitable functionality.

Components of system 200 and their respective sub-components may be linked by a system bus, wirelessly or by other suitable interconnections. Components may include RAM, ROM, an I/O module and a non-transitory or non-volatile memory. The I/O module may include a microphone, button and/or touch screen which may accept user-provided input. The I/O module may include a speaker for providing audio output and a video display for providing textual, audiovisual and/or graphical output.

Software applications may be stored within the non-transitory memory and/or other storage medium. Software applications may provide instructions to the processor circuit that enable components to perform various functions. For example, the non-transitory memory may store software applications such as an operating system, application programs, and an associated database. Some or all of computer executable instructions of the components may be embodied in hardware or firmware. The hardware and firmware may include one or more circuit boards. In some embodiments, the circuit boards may be integrated into a single chip. The chip may be silicon-based.

Components of system 200 may include cloud computing and virtualization implementations of software. Such implementations may be designed to run on a physical apparatus supplied externally by a hosting provider, a client, or other virtualized platform. Components may be operational with distributed computing environments where tasks are performed by remote processing devices that are linked through a communications network. In a distributed computing environment, program modules may be located in both local and remote computer storage media including memory storage devices. Components may rely on a network of remote servers hosted on the Internet to store, manage, and process data (e.g., "cloud computing" and/or "fog computing").

Software application programs may include the machine-readable label generator for generating the QR code, the QR code replicator for generating multiple versions of the composite image and the QR code scan predictor for determining a success of the scanning of the QR code.

Software application programs, which may be used by components of system 200, may include computer executable instructions for invoking user functionality related to communication, such as email, short message service ("SMS"), and voice input and speech recognition applications. Software application programs may utilize one or more algorithms that generate QR codes based on design choices entered by a user or any other suitable tasks.

Components of system 200 may support establishing network connections to one or more remote computers or networks. Each component of system 200 may be a node on a network. Illustrative network connections may include a local area network ("LAN") and a wide area network ("WAN") and may also include other networks. When used in a LAN networking environment, components may be connected to each other on the LAN through a network interface or adapter. Each component may include a communication circuit. The communication circuit may include a network interface card or adapter.

When used in a WAN networking environment, components may include a modem, antenna or other circuitry for establishing communications over a WAN, such as the Internet. The communication circuit may include a modem and/or antenna. The existence of any of various well-known protocols such as TCP/IP, Ethernet, FTP, HTTP and the like is presumed, and components may be operated in a client-server configuration to permit a user to retrieve web pages from a web-based server. Web browsers can be used to display and manipulate data on web pages.

Components of system 200 may be portable devices such as a laptop, tablet, smartphone, other "smart" devices or any other suitable device for receiving, storing, transmitting and/or displaying electronic information. Components of system 200 may include, and may be operational with, numerous other general purpose or special purpose computing system environments or configurations. Examples of computing systems, environments, and/or configurations that may be suitable for use with this disclosure include, but are not limited to, personal computers, server computers, handheld or laptop devices, tablets, "smart" devices, mobile phones, multiprocessor systems, microcomputers, minicomputers, mainframe computers, distributed computing environments that include any of the above systems or devices, and the like.

Components of system 200 may be produced by different manufacturers. Components of system 200 may capture and process data in different formats. For example, components may use different data structures to store captured data. Components of system 200 may utilize different communication protocols to transmit captured data or communicate with other systems. Despite such operational differences, components of system 200 may be configured to operate substantially seamlessly. Interoperability may allow a user to enter design choices using a first system, utilize a software engine running on a second system to generate an arrangement of modules that implement the design choices and display a QR code generated based on the arrangement of modules on a third system.

Components of system 200 may include QR code designer/scannability tester 201. QR code designer/scannability tester 201 may be a user interface ("UI") enabling a user to enter design choices for constructing a machine-readable optical label such as a QR code. QR code designer/scannability tester 201 may include a platform for testing scannability of the designed QR code.

QR code designer/scannability tester 201 may provide software tools for a user to enter illustrative design choices 203. QR code designer/scannability tester 201 may interact with AI engine 209. AI engine 209 may determine an arrangement of modules that generates a QR code in accordance with design choices 203 received from QR code designer/scannability tester 201. AI engine 209 may store the determined arrangement of modules in database 207.

AI engine 209 may utilize QR code generator 211 to construct a QR code in accordance with the determined arrangement of modules. In some embodiments, AI engine 209 may adjust an arrangement of modules each time a user enters one or more of design choices 203. AI engine 209 may utilize QR code generator 211 to generate and display a QR code that includes each of design choices 203 entered by a user. AI engine 209 and QR code generator 211 may be included in a software engine.

Following the generating of the QR code, QR code designer/scannability tester 201 may include as part of its functionality a QR code scannability testing platform for testing the scannability of the generated QR code. QR code replicator 213 and QR code scan predictor 215 may be executed via QR code designer 201.

QR code replicator 213 may construct multiple versions of the QR code to test the scannability of each of the multiple versions. The QR code may include both the QR code and the background-scene. The QR code scan predictor 215 may be executed for determining a success of the scanning of the QR code.

Multiple processors may increase the speed and capability of the program. The executable instructions may be stored in non-transitory memory on the computer system or a remote computer system, such as a server.

Other standard components of a computer system may be present. The computer system may be a server, mobile device, or other type of computer system. A server or more powerful computer may increase the speed at which the computer program may run. Portable computing devices, such as a smartphone, laptop or tablet, may increase the portability and usability of the computer program, but may not be as secure or as powerful as a server or desktop computer.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The computer may include, among other components, a communication link, a processor or processors, and a non-transitory memory configured to store executable data configured to run on the processor. The executable data may include an operating system and the correspondence data hub computer program.

A processor or processors may control the operation of the computer system and its components, which may include RAM, ROM, an input/output module, and other memory. The microprocessor(s) may also execute all software running on the apparatus and computer system. Other components commonly used for computers, such as EEPROM or Flash memory or any other suitable components, may also be part of the apparatus and computer system.

A communication link may enable communication with other computers as well as any server or servers. The communication link may include any necessary hardware (e.g., antennae) and software to control the link. Any appropriate communication link may be used, such as Wi-Fi, bluetooth, LAN, and cellular links. In an embodiment, the network used may be the Internet. In another embodiment, the network may be an internal intranet or other network.

The computer system may be a server. The computer program may be run on a smart mobile device. The computer program, or portions of the computer program may be linked to other computers or servers running the computer program. The server or servers may be centralized or distributed. Centralized servers may be more powerful and secure than distributed servers but may also be more expensive and less resilient.

Figure 3:
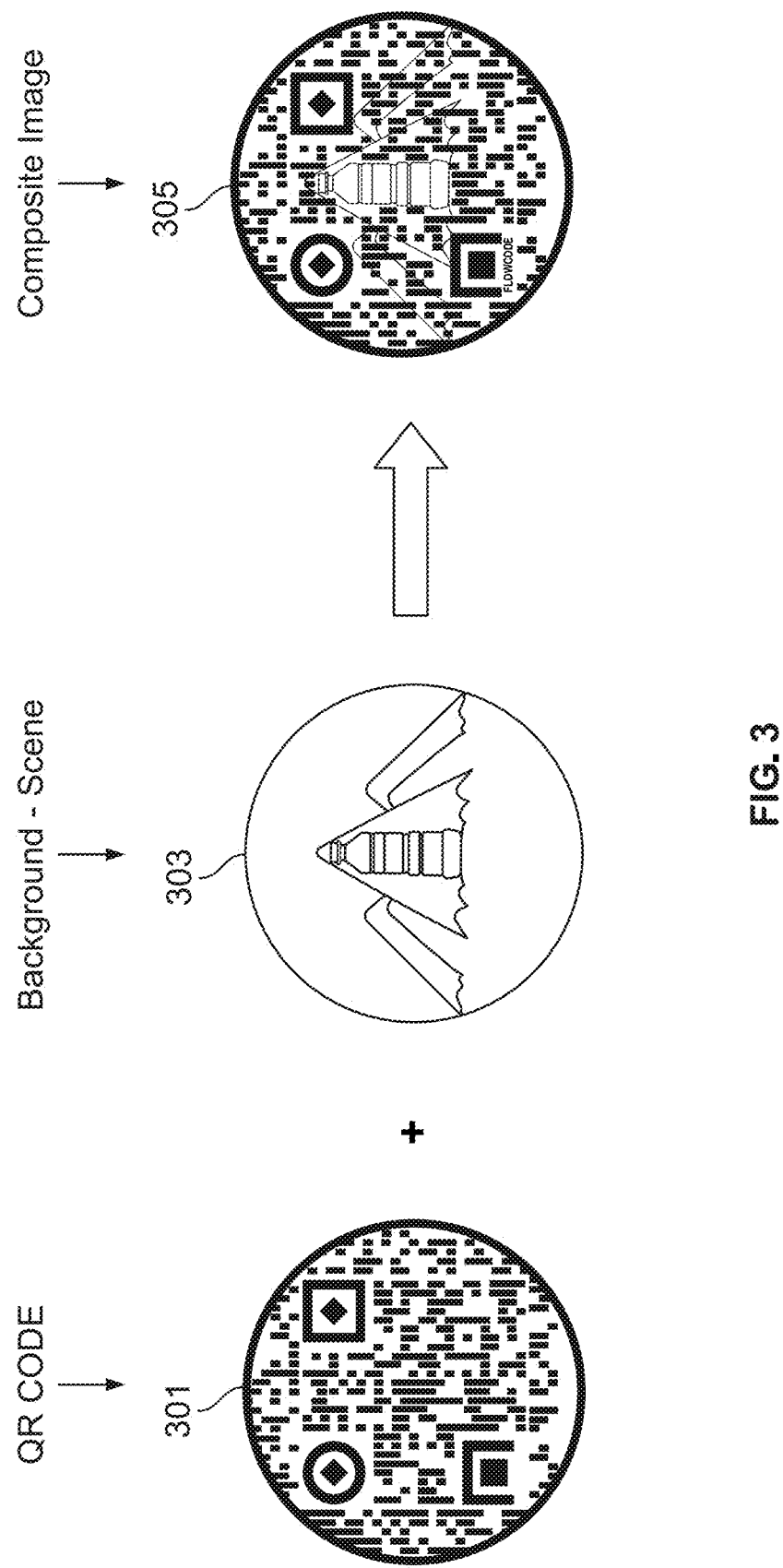
FIG. 3 shows an illustrative diagram in accordance with principles of the disclosure.

FIG. 3 shows an illustrative diagram of components of a composite image 305. Composite image 305 may include a combination of QR code 301 and background-scene 303.

QR code 301 may include some or all of the components included and described for label 100 in FIG. 1.

Background-scene 303 may include a logo of an entity for which the QR code is being generated. Background-scene 303 may include one or more images associated with the logo and/or entity for which the QR code is being generated.

When QR code 301 is being generated, a background-scene 303 may be selected or designed to go along with QR code 301.

Following the generating of QR code 301 and background-scene 303, both QR code 301 and background-scene 303 may be combined into a composite image 305. Composite image 305 may include all details and designs when combined. Composite image 305 may include all code embedded in QR code 301.

Composite image 305 may be submitted prior to production of composite image 305 for testing in all possible testing scenarios.

Figure 4:
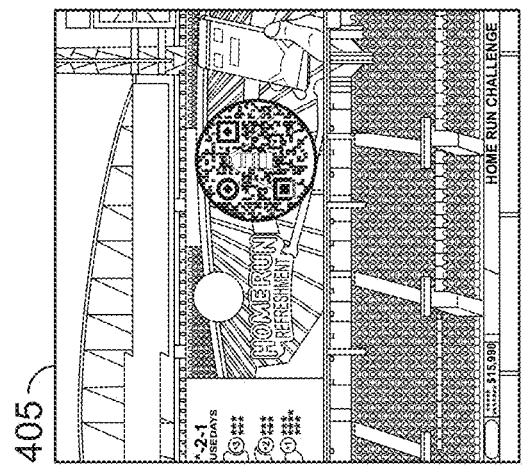
FIG. 4 shows an illustrative diagram in accordance with principles of the disclosure.
Figure 4:
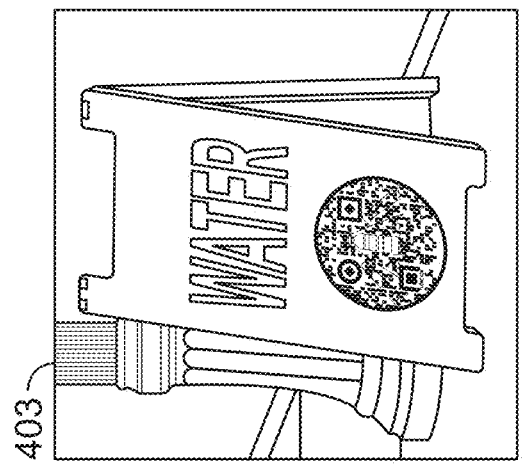
Figure 4:
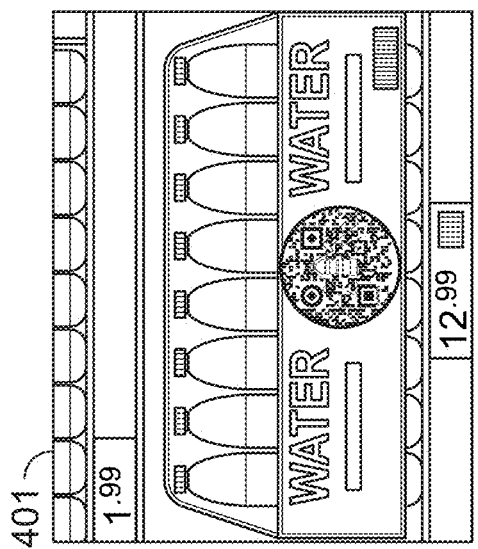

FIG. 4 shows an illustrative diagram of composite image 305 in a plurality of environments. These environments may include an indoor environment, an outdoor environment and a billboard environment. In accordance with principles of the disclosure, these environments may be simulated for composite image 305 in order to test the scannability of composite image 305 in each of these environments.

At 401, composite image 305 may be displayed on a product being sold in a store. At 403, composite image 305 may be displayed on an item in an outdoor environment. At 405, composite image 305 may be displayed on a screen in an outdoor stadium. In some embodiments the billboard environment may be a screen in an indoor or outdoor stadium.

For each of environments 401, 403 and 405, brightness and lighting may be adjusted on composite image 305 more closely to simulate the corresponding environment. It should be appreciated that any adjustments performed to the brightness and lighting of composite image 305, may be performed to both the QR code component of the composite image and the background-scene component of the composite image.

Figure 5:
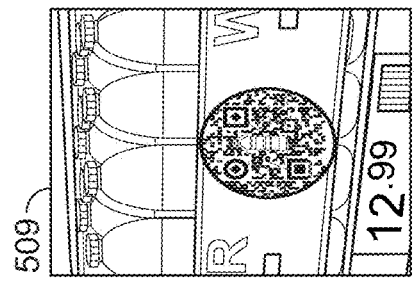
FIG. 5 shows an illustrative diagram in accordance with principles of the disclosure.
Figure 5:
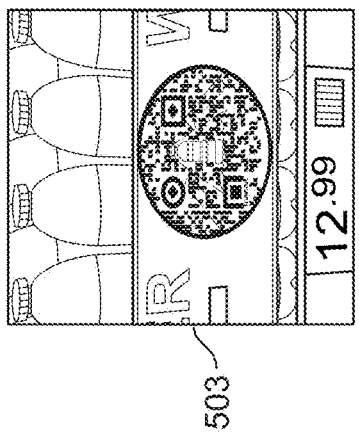
Figure 5:
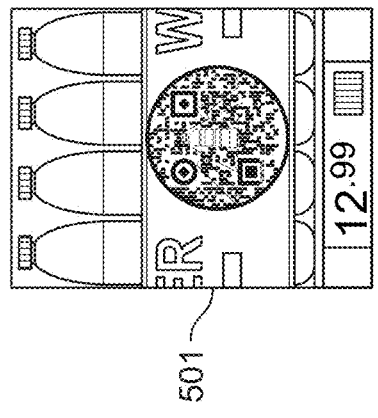
Figure 5:
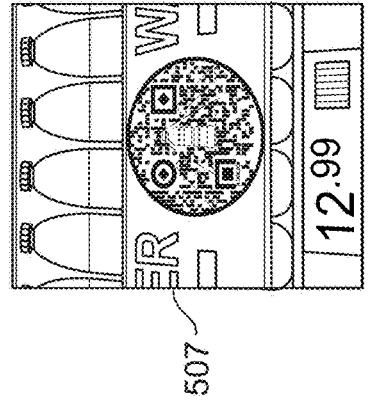
Figure 5:
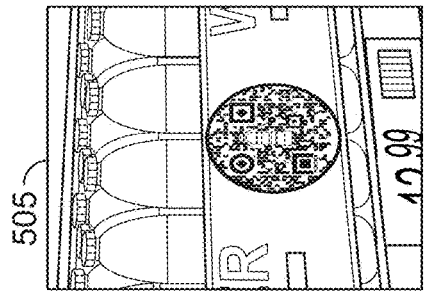

FIG. 5 shows an illustrative diagram of multiple perspectives of composite image 305 within an indoor environment. The multiple perspectives may include a center-view, a top-view, a left-view, a right-view and a bottom view. In accordance with principles of the disclosure, these perspectives may be simulated for composite image 305 in order to test the success of scannability of composite image 305 in each of the illustrated perspectives.

At 501, composite image 305 may be shown as being scanned from a direct centered-view perspective. This may indicate that the scanning device is directly in front of the QR code when being scanned.

At 503, composite image 305 may be shown as being scanned from a top-view perspective. This may be an indication that the scanning device is at a point above the composite image.

At 505, composite image 305 may be shown as being scanned from a left-view perspective. A left-view perspective may occur when the scanning device is positioned to the left of the composite image 305.

At 507, composite image 305 may be shown as being scanned from a bottom-view perspective. The bottom-view perspective may be an indication that the scanning device is positioned to lower than the composite image.

At 509, composite image 305 may be shown as being scanned from a right-view perspective. The right-view perspective may be an indication that the scanning device is positioned to the right of the composite image.

For example, when a scanning device is being used to scan a QR code, the scanning device may not always be directly in front of the QR code. The scanning device may be positioned in multiple perspectives when scanning the QR code. By simulating each of these perspectives and then testing the success of scannability in each of these perspectives, this may enable minimizing failures of scanning of QR codes once the QR codes are out for production.

Figure 6A:
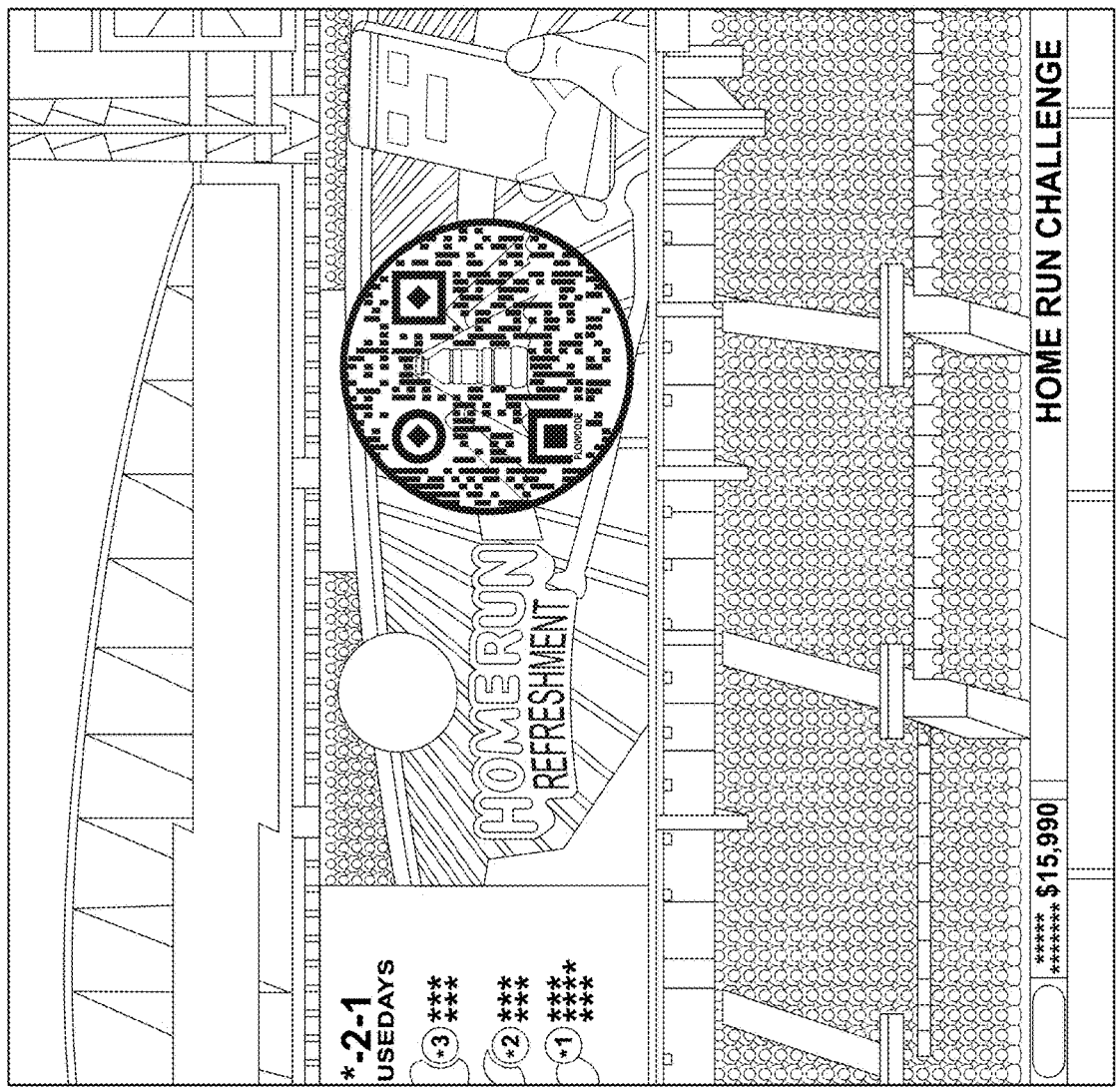
FIG. 6A shows an illustrative diagram in accordance with principles of the disclosure.

FIG. 6A shows an illustrative exemplary diagram of composite image 305 on an enlarged display screen of a stadium. When a QR code is displayed on an enlarged screen, a scanning device may be positioned in many different locations when scanning the QR code.

Figure 6B:
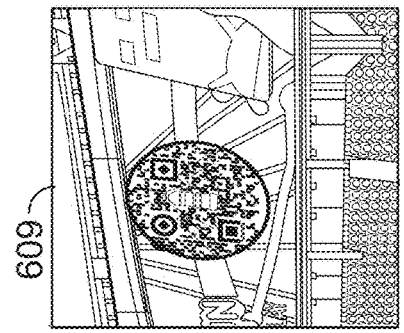
FIG. 6B shows an illustrative diagram in accordance with principles of the disclosure.
Figure 6B:
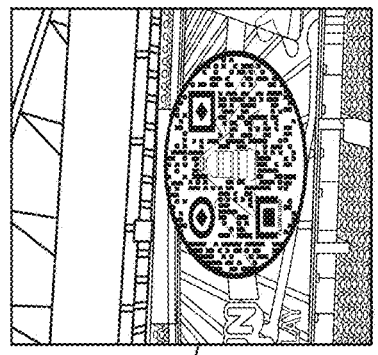
Figure 6B:
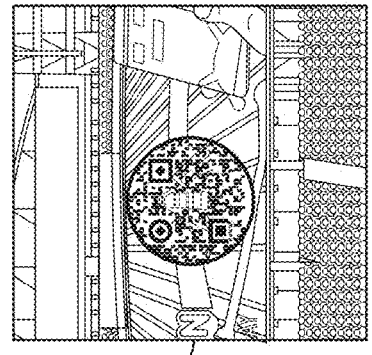
Figure 6B:
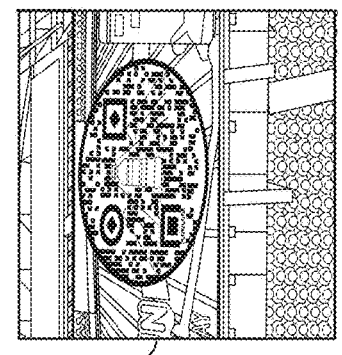
Figure 6B:
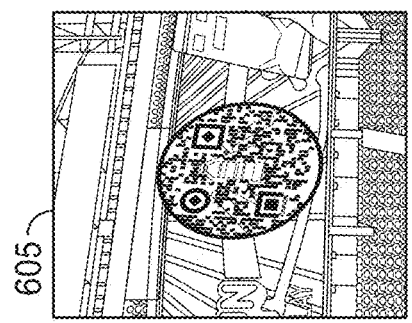

FIG. 6B shows an illustrative diagram of multiple perspectives of composite image 305 when displayed on the screen, as shown in FIG. 6A. When a QR code is displayed on a very large screen at a stadium, there may be numerous perspectives from where the scanning may be performed.

The composite image in this exemplary diagram may be transformed to a 3D composite image. A simulated scanning of the 3D composite image may be executed from at least the perspectives illustrated in FIG. 6.

At 601, the composite image may be scanned from a centered-view perspective. The simulating of the scanning of the centered-view perspective may enable a testing of success of scanning from devices that may be within the center area of the audience facing the stadium screen.

At 603, the composite image may be displayed as being scanned from a top-view perspective. The simulating of the scanning from a top-view perspective may include testing the success of the scanning from devices that may be raised above the center area of the stadium screen.

At 605, the composite image may be displayed as being scanned from a left-view perspective. The simulating of the scanning from the left-view perspective may include testing the success of the scanning from devices that may be positioned within the left side area facing the stadium screen.

At 607, the composite image may be displayed as being scanned from a bottom-view perspective. The simulating of the scanning from the bottom-view perspective may include testing the success of the scanning from devices that may be positioned lower than the center area facing the stadium screen.

At 609, the composite image may be displayed as being scanned from a right-view perspective. The simulating of the scanning from the right-view perspective may include testing the success of the scanning from devices that may be positioned within the right side area facing the stadium screen.

FIG. 7 shows an illustrative exemplary diagram of the scores for each of the simulated environments and perspectives of the composite image.

Scoring table 701 displays a passing score which may be returned as either 'true' or 'false.' The passing score may return as "true" when a success of scannability of at least one perspective within at least one environment is scannable. When the composite image may not be scannable from at least one perspective, the passing score may be returned as 'false.'

In some embodiments, when at least one perspective for each of the environments successfully scans, the result may be displayed as 'true.' When a code cannot be scanned in each environment from at least one perspective, the passing score may be displayed as 'false' regardless of the individual scores.

Scoring table 701 may also display an overall score and each individual score. The overall score may be an average of all the scores or any other suitable weighted average. When the overall average score is greater than the pre-determined percentage, the QR code may 'pass' as scannable. The pre-determined percentage may be 50%. The pre-determined percentage may be 60%. The pre-determined percentage may be 70%. The pre-determined percentage may be 80%, 85%, 90% or any other suitable percentage.

In some embodiments, the pre-determined percentage may be based on the level of error correction included when the QR code was generated. When the QR code includes a 30% error correction level, the pre-determined percentage for passing may be 70%. When the QR code includes a 15% error correction level, the pre-determined percentage for passing may be 85%.

By assigning a score for each individual perspective and environment, this may enable targeting the underlying causes for unsuccessful scanning and/or for improving scannability even when the QR code passes as scannable.

In some embodiments, each score may be an average score. For each environment, an average of the perspectives within that environment may be displayed as the average score. For example, the "indoor" score may reflect an aggregate score for the success of scanning of the composite image in all perspectives within an indoor environment. The "outdoor" score may reflect an aggregate score for the success of scanning of the composite image in all perspectives within the outdoor environment. The "megatron" score may reflect an aggregate score for the success of scanning of the composite image in all perspectives within the oversized electronic screen environment.

Additionally, for each perspective taken within each environment, an average of the scannability for each environment using the displayed perspective may be displayed as the average score. For example, the "bottom" perspective score may reflect an aggregate score of a bottom perspective of the composite image within each of the plurality of environments. The "top" perspective score may reflect an aggregate score of a top perspective of the composite image within each of the plurality of environments.

FIG. 8 shows an illustrative diagram of a QR code testing tool platform 801. Platform 801 may be a tool for generating the QR code and background-scene. QR code testing tool platform 801 may also operate as a platform for combining the QR code and background-scene as a composite image.

Platform 801 may further provide selectable tools for testing the success of the scanning of the generated composite image in one or more environments and one or more perspectives.

Platform 801 may provide an option for simulating all environments and perspectives for each composite image being tested. Upon selection of the option for simulating all environments and perspectives, multiple versions of the composite image may be generated to mimic each type of environment and each perspectives. Following the generating, a scan may be simulated for each of the multiple versions of the composite image and further tested for scannability.

Platform 801 may also provide user-configurable options. The user-configurable options may enable the user to select from a plurality of environments and perspectives, one or more specific environments and perspectives that may apply to the composite image.

Figure 9:
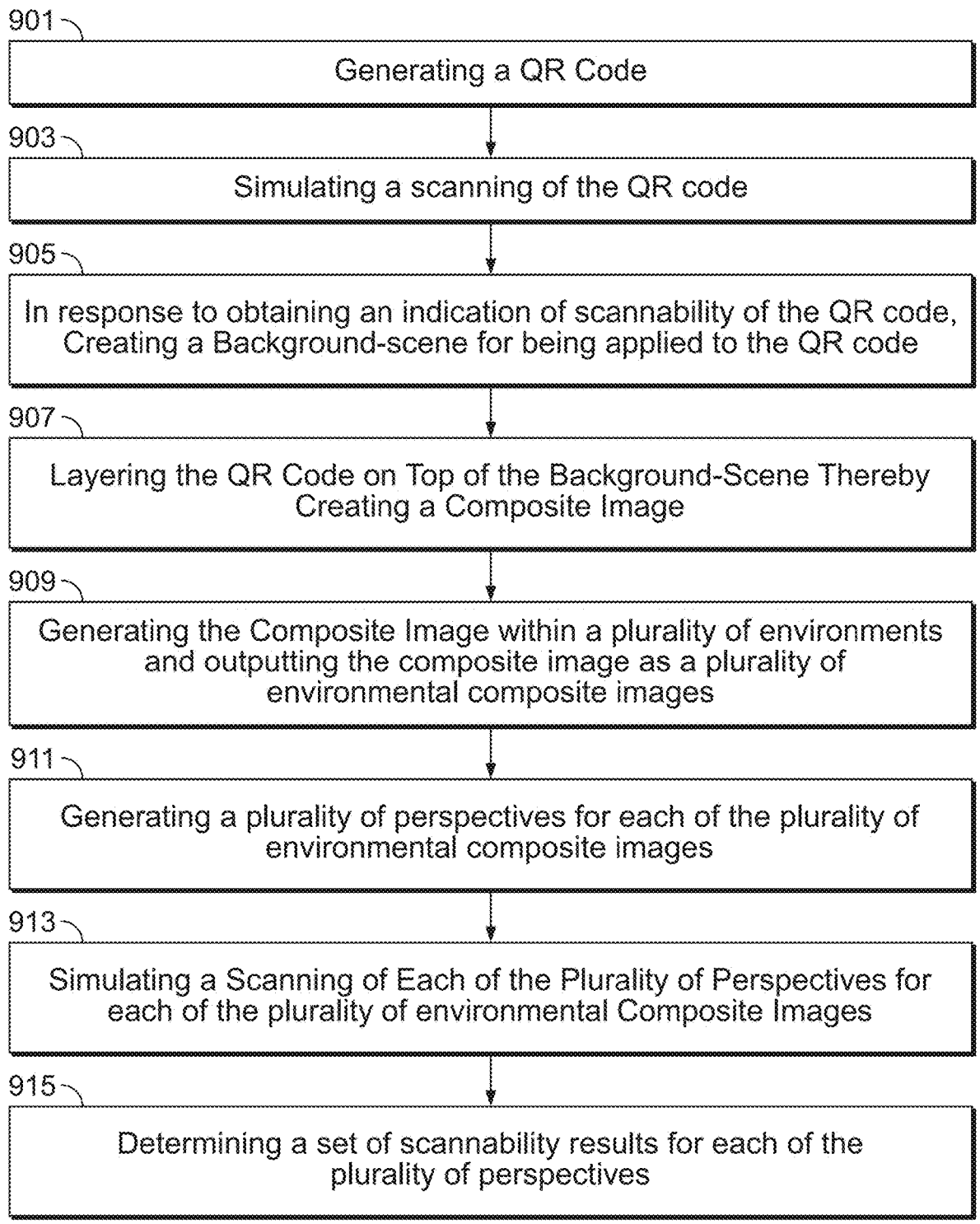
FIG. 9 shows an illustrative flow chart in accordance with principles of the disclosure.

FIG. 9 shows an illustrative flow chart of methods steps that may be performed for simulating a scanning of a QR code within multiple scenarios.

At 901, the method step may include generating a QR code. The QR code may be generated via a UI platform enabling a user to design the colors, shading, shapes and any other suitable designs. The QR code may be generated via a third-party and uploaded to the UI platform.

At 903, the method step may include simulating a scanning of the QR code.

At 905, the method step may include, in response to obtaining an indication of scannability of the QR code, creating a background-scene for being applied to the QR code. The background-scene may include an image, logo, background and/or any other suitable background-scene. In some embodiments, the background-scene may also be created via the UI platform.

At 907, the method step may include combining the QR code with the background-scene to create a composite image. In some embodiments the combining of the QR code with the background-scene may include layering the QR code on top of the background-scene or behind the background-scene.

At 909, the method step may include the composite image within a plurality of environments and further outputting the composite image as a plurality of environmental composite images.

At 911, the method step may include generating a plurality of perspectives for each of the plurality of environmental composite images.

At 913, the method step may include simulating a scanning of each of the plurality of perspectives for each of the plurality of environmental composite images.

At 915, the method step may include, determining a set of scannability results for each of the plurality of perspectives.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Thus, apparatus and methods for simulating a scanning of a QR code for testing a scannability of the QR code are provided. Persons skilled in the art will appreciate that the present invention can be practiced by other than the described embodiments, which are presented for purposes of illustration rather than of limitation.

What is claimed is:

1. A method for simulating a scanning of a quick-response ("QR") code within multiple scenarios, the simulating for testing a scannability of the QR code within the multiple scenarios, the method comprising:
generating the QR code, the QR code comprising a data zone and an environmental zone;
simulating the scanning of the QR code; and
in response to obtaining a positive indication of scannability of the QR code:
creating a background-scene for being applied to the QR code;
combining the QR code with the background-scene thereby creating a composite image;
generating the composite image within a plurality of environments by:
adjusting a brightness of selected colors of the composite image to mimic the composite image in each of the plurality of environments, the adjusting including adjusting both the brightness of the selected colors of the QR code and of the background-scene; and
in response to the adjusting, outputting the composite image as a plurality of environmental composite images comprising:
an indoor environment composite image;
an outdoor environment composite image; and
an oversized electronic screen environment composite image; and
predicting the scannability of each of the plurality of environmental composite images by:
simulating a scanning of each of the plurality of environmental composite images; and
determining scannability for each of the indoor environment composite image, the outdoor environment composite image and the oversized electronic screen environment composite image.

2. The method of claim 1 further comprising generating a plurality of perspectives for each of the plurality of environmental composite images, wherein the plurality of perspectives comprises a top-view perspective, a bottom-view perspective, a left-view perspective, a right-view perspective and a centered-view perspective.

3. The method of claim 2 wherein, for the indoor environment composite image:
repositioning the indoor environment composite image to mimic the plurality of perspectives; and
in response to the repositioning, outputting a plurality of perspective indoor environment composite images.

4. The method of claim 3 wherein, for the outdoor environment composite image the method comprises:
repositioning the outdoor environment composite image to mimic the plurality of perspectives; and
in response to the repositioning, outputting a plurality of perspective outdoor environment composite images.

5. The method of claim 4 wherein, for the oversized electronic screen environment composite image the method comprises:
repositioning the oversized electronic screen environment composite image to mimic the plurality of perspectives; and
in response to the repositioning, outputting a plurality of perspective oversized electronic screen environment composite images.

6. The method of claim 5 further comprising determining a set of scannability results for each of the plurality of perspectives within each of the plurality of environments, the determining of the set of scannability results comprising:
for the indoor environment composite image:
generating a score for each of the plurality of perspective indoor environment composite images; and
determining an average score for the indoor environment composite image;
for the outdoor environment composite image:
generating a score for each of the plurality of perspective outdoor environment composite images; and
determining an average score for the outdoor environment composite image; and
for the oversized electronic screen environment composite image:
generating a score for each of the plurality of perspective oversized electronic screen environment composite images; and
determining an average score for the oversized electronic screen environment composite image.

7. The method of claim 6 wherein, when the average score for any of the indoor environment composite image, outdoor environment composite image or oversized electronic screen environment composite image is less than a pre-determined percentage, the method comprises triggering one or more corrective protocols and re-simulating the scanning.

8. The method of claim 1 wherein when in response to the simulating of the scanning of the QR code, a negative indication of scannability of the QR code is obtained, the method comprises re-engineering the QR code to overcome the negative indication of scannability.

9. The method of claim 1 wherein the combining the QR code with the background-scene comprises positioning the background-scene behind the QR code, overlaying the QR code, or blended in with the QR code.

10. The method of claim 9 wherein the background-scene comprises a logo associated with an entity.

11. The method of claim 10 wherein the background-scene comprises the logo and a plurality of design choices comprising colors, shapes, color gradients and shading.

12. The method of claim 1 wherein the generating the composite image into the plurality of perspectives comprises:
identifying four key coordinates of the composite image;
for each of the plurality of perspectives, running a coefficient algorithm on each of the four key coordinates using a pre-defined coefficient; and
in response to the running, outputting each of the plurality of perspectives.

13. The method of claim 1 further comprising maintaining coded content embedded in the QR code while generating the plurality of perspectives for each of the plurality of environments of the composite image.

14. The method of claim 1 wherein the data zone comprises machine readable instructions that, when scanned, trigger an action on a device used to scan the QR code.

15. The method of claim 1 wherein the environmental zone comprises a buffer of light modules that surround the data zone and associated position detection patterns and enables a scanning device to distinguish the data zone from its surrounding environment zone.

16. A method for simulating one or more scenarios, the one or more scenarios for testing a quick response ("QR") code, the method comprising:
generating the QR code;
simulating a scanning of the QR code; and
in response to obtaining a positive indication of scannability of the QR code:

creating a background-scene for being applied to the QR code;
combining the QR code with the background-scene thereby creating a composite image;
receiving a selection of a testing environment via a QR code testing tool platform displayed on a graphical user interface ("GUI") for testing the composite image, the selection from a selectable plurality of testing environments available for testing the composite image, the selectable plurality of testing environments comprising:
 an indoor environment;
 an outdoor environment; and
 an oversized electronic screen environment;
adjusting a brightness of colors of the composite image to mimic the composite image within the selected testing environment;
in response to the adjusting, outputting the composite image as a selected testing environment composite image; and
predicting a scannability of the selected testing environment composite image by:
 simulating a scanning of the selected testing environment composite image; and
 determining scannability of the selected testing environment composite image.

17. The method of claim 16 further comprising generating a plurality of perspectives of the selected testing environment composite image.

18. The method of claim 17 wherein the predicting of scannability comprises predicting scannability of each of the plurality of perspectives of the selected testing environment composite image.

19. A method for simulating a scanning of a quick-response ("QR") code within multiple scenarios, the method utilizing a computer processor and one or more non-transitory computer-readable media storing computer executable instructions, the instructions when executed by the computer processor test a scannability of the QR code to obtain a scannability index value for the QR code, the method comprising:
 using a QR code generator to generate the QR code, the QR code comprising a data zone and an environmental zone;
 using a QR code scan predictor to:
  simulate the scanning of the QR code; and
  obtain a positive indication of scannability of the QR code;
 using the QR code generator further to:
  create a background-scene for being applied to the QR code;
  combine the QR code with the background-scene thereby creating a composite image; and
  store the composite image in a memory;
 using a QR code replicator for generating the composite image within a plurality of environments, the QR code replicator configured to:
  retrieve the composite image from memory;
  adjust a brightness of selected colors of the composite image to mimic the composite image in each of a plurality of environments, the adjusting including adjusting both the brightness of the selected colors of the QR code and of the background-scene;
  in response to the adjusting, output a plurality of environmental composite images, the plurality of environmental composite images comprising:
   an indoor environment composite image;
   an outdoor environment composite image; and
   an oversized electronic screen environment composite image;
  store the plurality of environmental composite images in memory; and
 using the QR code scan predictor further to predict scannability of the composite image, the QR code scan predictor configured to:
  simulate a scan of each of the plurality of environmental composite images; and
  determine scannability for each of the plurality of environmental composite images.

20. The method of claim 19 further comprising generating a plurality of perspectives for each of the plurality of environmental composite images by repositioning the composite image into multiple positions to mimic the plurality of perspectives, the repositioning including repositioning both the QR code and the background-scene, wherein the plurality of perspectives comprises a top-view perspective, a bottom-view perspective, a left-view perspective, a right-view perspective and a centered-view perspective.

* * * * *